Sept. 13, 1927.  E. J. OVINGTON  1,642,307
PROCESS OF MAKING TEA BALL TAGS
Filed Dec. 22, 1923
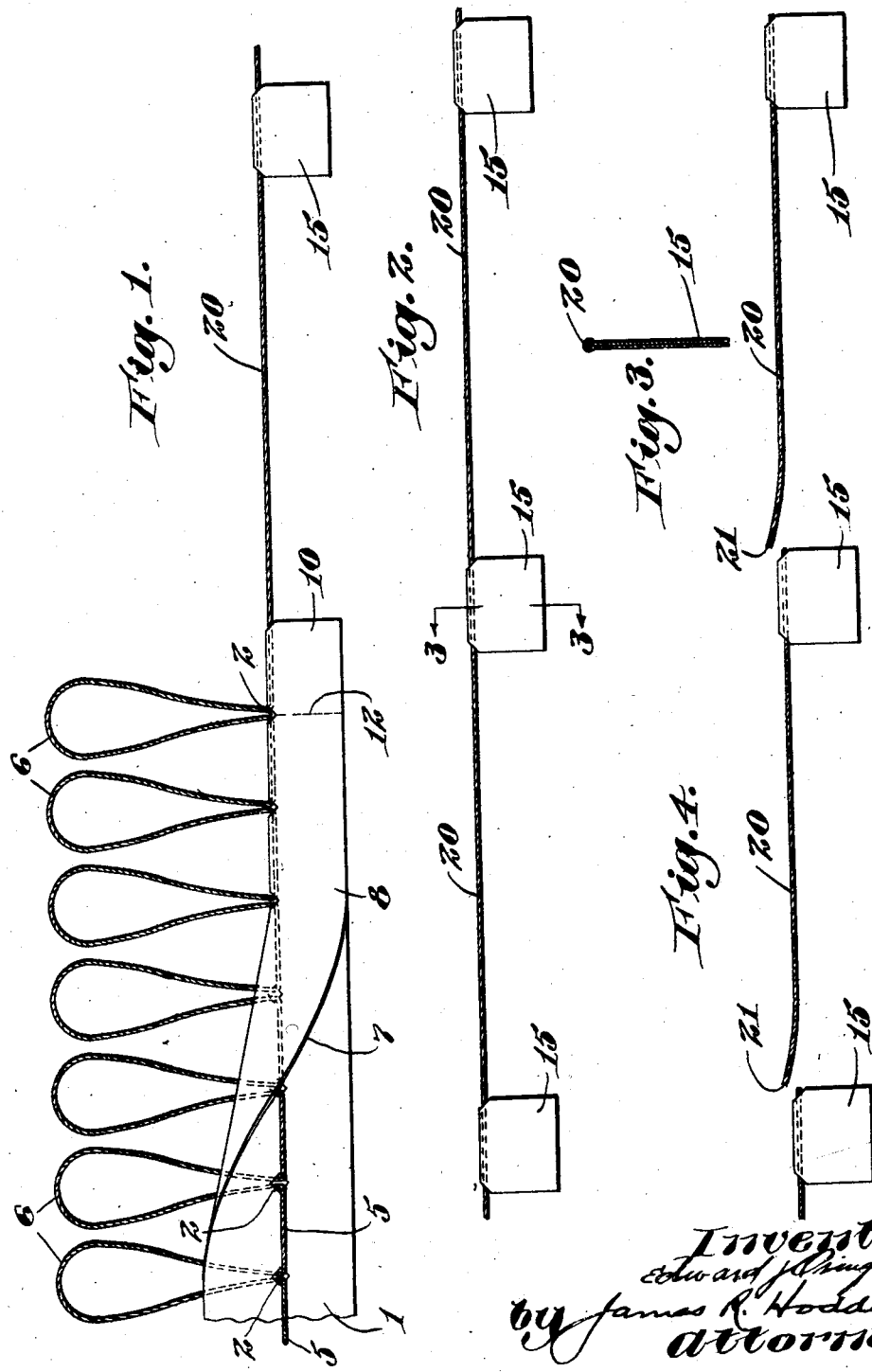

Patented Sept. 13, 1927.

1,642,307

UNITED STATES PATENT OFFICE.

EDWARD J. OVINGTON, OF NEWTON, MASSACHUSETTS.

PROCESS OF MAKING TEA-BALL TAGS.

Application filed December 22, 1923. Serial No. 682,339.

My present invention is a novel and improved method of manufacturing tags attached to a single string, particularly for use with tea balls, and includes both the process of making same and the resulting tag as an article of manufacture. It is customary and necessary to attach to small bags containing tea, for use in immersion in cups of tea, pots of tea, or the like, an attached tag and string. This is required to suspend the small bag containing the tea leaves in the cup or pot to leave the same for the desired length of time to secure the resulting strength which the user may wish, and then to remove the same. These tea bags, as is well known, are lightly woven textile material, of sufficiently tight weave to retain the tea leaves, while being amply porous for the rapid permeation of the hot water in the cup or pot. It is desirable that the tag and attaching cord or string from the tea ball to the tag be sufficiently strong to suspend and remove the tea bag, the tag itself giving a firm and convenient grip or handhold for this purpose, and also being preferably ornamental. Preferably also the tag is of sufficient size, area and material to be utilized for advertising purposes, to designate the kind of tea with which the bag is filled, and the importers, manufacturers or advertiser's trademark name thereon.

Heretofore it has required considerable skill to thread through or attach the cord, tag, and tea ball, uniting the same in a sufficiently firm and proper manner for use. These tea bags are as small and delicate as is possible, and the cords or strings are preferably light threads, thus rendering the hand operation heretofore necessary of attaching and threading, both difficult and expensive. Furthermore, this attaching of thread and tag was heretofore performed as a single, individual tag and thread attaching operation, viz, a single tag and a single length of thread appropriate for uniting the bag and the tag were attached. The difficulty of thus preparing tea tags and threads in large numbers and quantities will be at once apparent.

My present invention obviates the difficulties heretofore experienced in the manufacture, attaching and use of different tags and strings or threads for the purpose above outlined, and enables me to make and attach the tags and threads in a firm, rigid and satisfactory manner, and by a continuous process. I believe that my invention of a continuous process or method of manufacturing united lengths of single string tags, is a distinct novelty in this art, and I wish to claim the same herein broadly.

Furthermore, I believe that the resulting tag which I have devised to carry out my novel process, is a distinct novelty as an article of manufacture, and presents an improved, more strong and durable attachment, as well as a more desirable article, as a single thread or string tea tag, than has heretofore been possible, and I wish to claim the resulting tag and attached thread as an improved article of manufacture.

In carrying out my invention I may utilize either hand methods or a suitable machine, an important feature of the invention consisting in the applying of a continuous thread, string or cord, to and between a double layer of tag material. The string and the resulting double strip of tag material may then be cut or severed into individual tags and attached string lengths, either by an automatic cutting operation or by a separate hand cutting action if and when desired.

In the present application I have shown a simple method of carrying out my process wherein a folded strip of tag material, such as paper or the like, is enclosed about the string, appropriate loops of the string to provide lengths for subsequent individual single string tags when severed from the strip being formed, the doubled or folded layer constituting the tag proper enclosing and adhering to the string as well as to the two layers constituting the completed tag.

In my copending application Ser. No. 682,338, filed Dec. 22, 1923, I have illustrated a further modification wherein the tea tag and attached string are attached by the union of two separate strips with the string preferably arranged centrally, and loops for suitable lengths of attached string being also formed.

In my present case I propose to claim my process of continuous manufacture broadly, which will cover the form shown in the present case, as well as in said copending case, and herein I am also claiming the broad resulting double layered tag and attached string as an article of manufacture, claiming in said copending case the particular form of double layered tag and centrally attached string as therein shown.

Referring to the drawings,

Fig. 1 is a fragmentary view illustrating my process and showing the formation of a folded layer of tag material and attached string;

Fig. 2 shows the tags and strings with the tags separated;

Fig. 3 is a cross-sectional view on the line 3—3 of Fig. 2; and

Fig. 4 illustrates the final step of separating the attached tag and string into predetermined string lengths and individual single string tea tags.

In the present form of tag employed I carry out my process by preparing a strip or sheet of tag material, such as paper or the like, as indicated at 1, this being of double the width of the completed tag. The strip thus prepared is provided with a plurality of openings or recesses, indicated at 2, 2. These openings are arranged centrally and preferably are small diamond shaped cuts, formed, stamped or otherwise made throughout the length of the strip, or as it is being moved during the progressive operation, and these recesses 2 are appropriately spaced for determination of the individual tags. A thread or cord 5 is positioned or led through the strip 1 and loops of this thread 5, as indicated at 6, 6, are formed, passing from one side of the strip 1 through the recesses and are drawn into proper lengths on the opposite side of the strip 1, so that the completed length of string comprised within the loop 6 will gives the desired distance from the tea ball to the tea tag. When the strip 1 and looped sections 6 are thus formed, the strip 1 is then doubled, as indicated at 7, and 8, said strip being appropriately prepared with suitable adhesive for the uniting of the two layers thus doubled onto each other into the completed double layered tag material, as indicated at 10. This doubling, as well as the adhesive action not only unites the layers into the completed tag, but also unites the tag onto the cord 5. Slight pressure, as by rolls or the like, will result in the firm union of the two layers and the attachment of the string thereto, simultaneously. The operation thus described attaches a single string to a length of tag material, with both the material and the string prepared in suitable form for subsequent cutting or division into individual string lengths. This latter cutting operation is readily accomplished, either by machine or hand, by cutting the doubled tag layers now formed into the completed strip 10 and attached cord 5, on a line preferably perpendicular to the recessed openings 2, as indicated at 12, Fig. 1. When thus cut the completed tag 15 may then be separated for the length of the intervening cord 20, constituting the two portions of the loop 6. The subsequent severing of the cord attached to one tag 15 adjacent the next succeeding tag 15, as indicated at 21, Fig. 4, completes the individual tag and string. I believe that my process and the resulting article as thus explained is distinctly novel and constitutes a great advance in this art.

My invention of providing a continuous string, with tags or tag material attached at intervals, is also an important, novel and advantageous feature, permitting of continuous manufacture of the combined tag and string as a completed article of manufacture and constituting a long step forward over the individual attachment of a tag and a short length of string. This feature permits great speed of operation, and a machine operation to be provided in place of the former hand work. Consequently great economy in manufacture as well as a hygienic article untouched by hands—a most important feature in articles dealing with food products—results. Furthermore the single string is quite sufficient for attachment of the tag and tea ball and constitutes itself a distinct novelty;—it being heretofore considered necessary to thread the loop or doubled end of a string to attach it to a tag, as is customary in commercial tag work. My invention utilizing a single string and attaching the single string permanently to the tag, is a distinct novelty.

My invention is further described and defined in the form of a claim as follows:

The process of forming individual tags and attached predetermined lengths of string, which consists in preparing a strip of tag material of double width to that of the completed tag, forming recesses centrally in said strip and at predetermined spaced intervals along the length thereof, positioning a single string centrally of said strip with a loop of predetermined length drawn through each recess, then doubling said strip and uniting its opposed layers by adhesive, simultaneously attaching same to the predetermined length of string thus held in the doubled layer between said recesses, severing said tags from each other on a line with said recess and in the bight of the loop, and thereafter severing said string adjacent to a tag, thereby producing a single string tag.

In testimony whereof, I have signed my name to this specification.

EDWARD J. OVINGTON.